US009722322B2

(12) United States Patent
Bertin et al.

(10) Patent No.: US 9,722,322 B2
(45) Date of Patent: Aug. 1, 2017

(54) TWO-POLARIZATION SWITCHED-BEAM ANTENNA FOR WIRELESS COMMUNICATION SYSTEMS

(75) Inventors: Giorgio Bertin, Turin (IT); Marco Braglia, Turin (IT); Ivano Salvatore Collotta, Turin (IT); Bruno Melis, Turin (IT); Bruno Piovano, Turin (IT); Roberto Vallauri, Turin (IT); Filiberto Bilotti, Rome (IT); Lucio Vegni, Rome (IT)

(73) Assignee: TELECOM ITALIA S.p.A., Milan (IT)

( * ) Notice: Subject to any disclaimer, the term of this patent is extended or adjusted under 35 U.S.C. 154(b) by 349 days.

(21) Appl. No.: 14/006,519

(22) PCT Filed: Mar. 29, 2012

(86) PCT No.: PCT/EP2012/055680
§ 371 (c)(1),
(2), (4) Date: Sep. 20, 2013

(87) PCT Pub. No.: WO2012/130972
PCT Pub. Date: Oct. 4, 2012

(65) Prior Publication Data
US 2014/0009347 A1    Jan. 9, 2014

(30) Foreign Application Priority Data

Apr. 1, 2011  (IT) .............................. TO2011A0301

(51) Int. Cl.
*H01Q 21/24*     (2006.01)
*H01Q 1/22*      (2006.01)
(Continued)

(52) U.S. Cl.
CPC .......... *H01Q 21/24* (2013.01); *H01Q 1/2258* (2013.01); *H01Q 3/24* (2013.01); *H01Q 21/28* (2013.01);
(Continued)

(58) Field of Classification Search
CPC ...... H01Q 21/24; H01Q 1/2258; H01Q 21/28; H01Q 3/24; H04B 7/0874; H04B 7/10; H04B 7/0871
See application file for complete search history.

(56) References Cited

U.S. PATENT DOCUMENTS 2,185,336 A * 1/1940 Gerardi ...................... 455/193.1
6,205,337 B1   3/2001 Boch
(Continued)

FOREIGN PATENT DOCUMENTS

EP         2 276 116 A1    1/2011
WO    WO 2008/064696 A1    6/2008

OTHER PUBLICATIONS

International Search Report issued Jun. 26, 2012, in PCT/EP2012/055680.
(Continued)

*Primary Examiner* — Graham Smith
*Assistant Examiner* — Noel Maldonado
(74) *Attorney, Agent, or Firm* — Oblon, McClelland, Maier & Neustadt, L.L.P.

(57) ABSTRACT

An antenna device including: a first antenna assembly configured to receive first radiofrequency signals polarized according to a first polarization; a second antenna assembly configured to receive second radiofrequency signals polarized according to a second polarization orthogonal to the first polarization; and a radiofrequency signal handling assembly coupled with the first and second antenna assemblies, and configured to handle the received first radiofre-
(Continued)

quency signals separately from the received second radio-frequency signals.

14 Claims, 8 Drawing Sheets

(51) Int. Cl.
  *H01Q 3/24* (2006.01)
  *H01Q 21/28* (2006.01)
  *H04B 7/10* (2017.01)
  *H04B 7/08* (2006.01)

(52) U.S. Cl.
  CPC .............. *H04B 7/0871* (2013.01); *H04B 7/10* (2013.01); *H04B 7/0874* (2013.01)

(56) References Cited

U.S. PATENT DOCUMENTS

| | | |
|---|---|---|
| 6,445,926 B1 | 9/2002 | Boch et al. |
| 6,577,879 B1 | 6/2003 | Hagerman et al. |
| 2002/0132600 A1 | 9/2002 | Rudrapatna |
| 2004/0077379 A1* | 4/2004 | Smith et al. ............... 455/562.1 |
| 2008/0258981 A1* | 10/2008 | Achour et al. ................ 343/702 |
| 2011/0102293 A1* | 5/2011 | Chen et al. ................... 343/876 |

OTHER PUBLICATIONS

T. Itoh, "Invited paper: Prospects for metamaterials", Electronics Letters, vol. 40, No. 16, Aug. 5, 2004, pp. 972-973.

\* cited by examiner

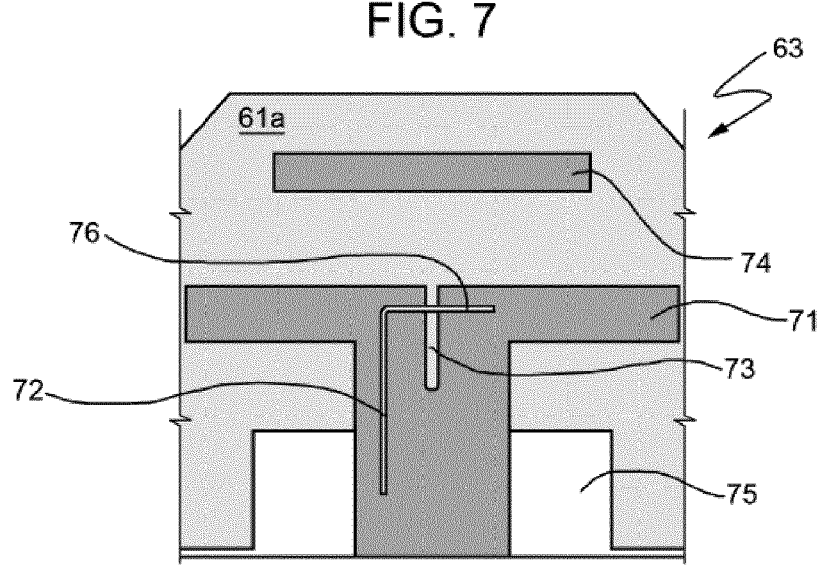
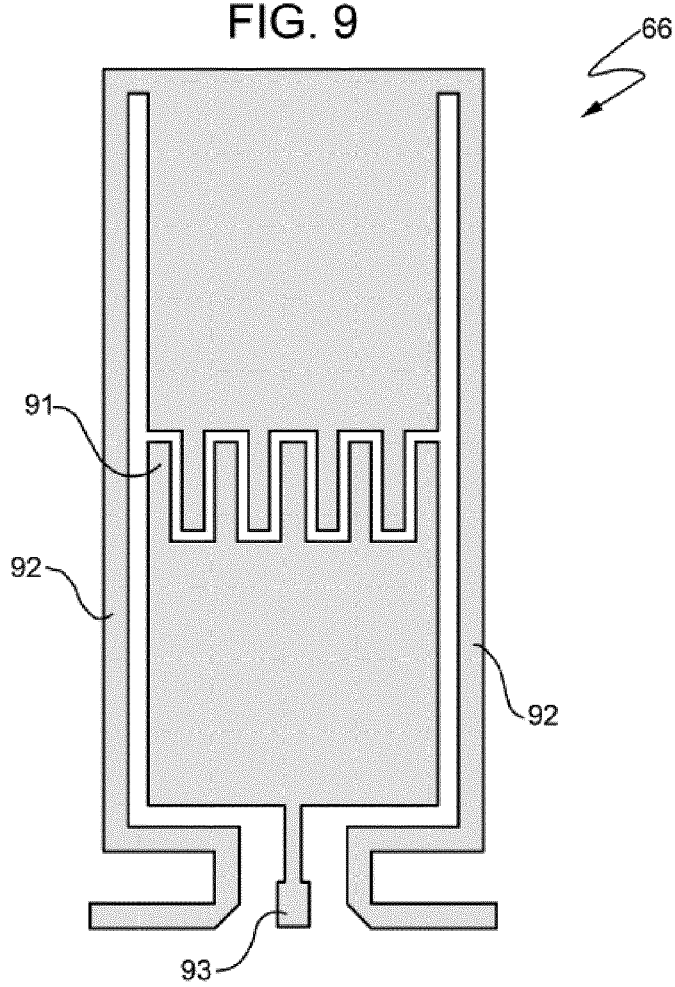

FIG. 8
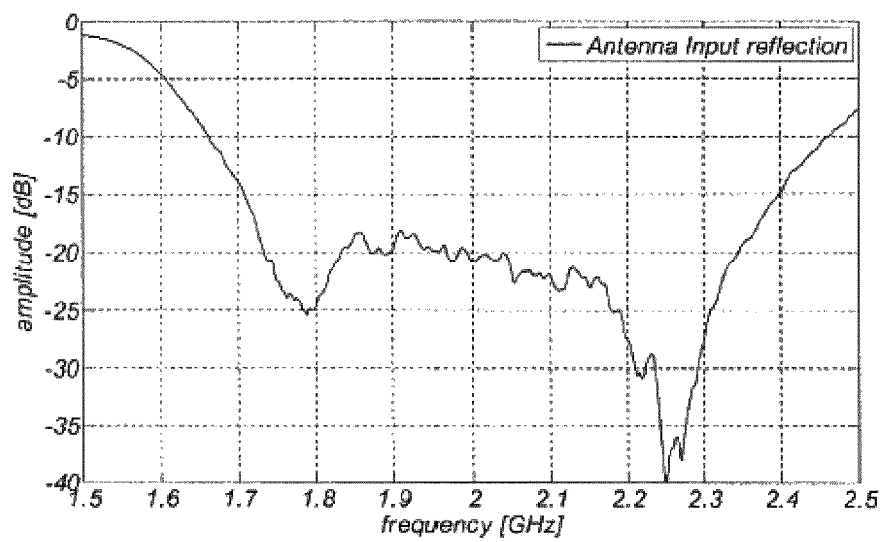
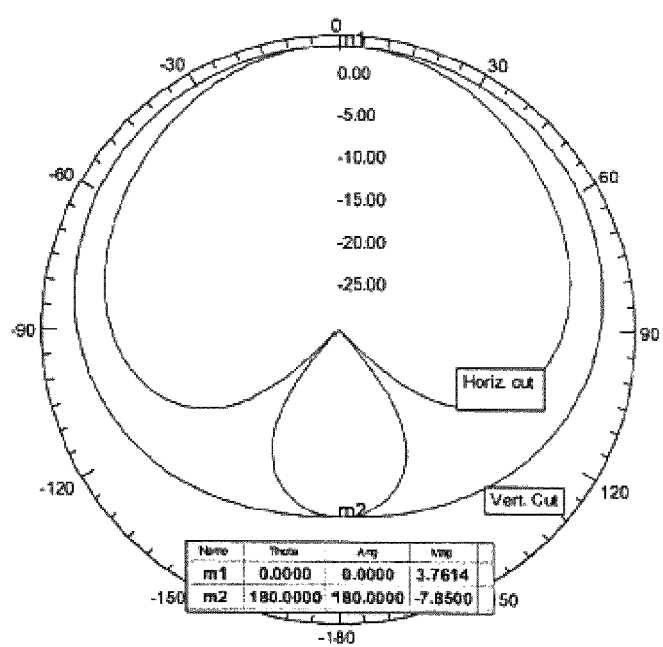

TWO-POLARIZATION SWITCHED-BEAM ANTENNA FOR WIRELESS COMMUNICATION SYSTEMS

TECHNICAL FIELD OF THE INVENTION

The present invention relates in general to wireless communication systems, and more specifically to antennas used in wireless communication devices to transmit/receive radiofrequency (RF) signals. Examples of wireless communication devices can be Universal Serial Bus (USB) plug-in dongles, portable mini-hubs for wireless Local Area Networks (LAN) (e.g. based on IEEE 802.11a/b/g/n standards) and/or cellular networks (e.g. based on High Speed Downlink Packet Access (HSDPA) standard or on Long Term Evolution (LTE) standard), game consoles, control devices, personal computers, laptops, etc.

BACKGROUND ART

As is known, antennas currently used in radio communication devices, such as USB plug-in dongles, are characterized by nearly omnidirectional radiation diagrams (i.e., have low gains) that severely limit achievable performances in terms of data rate.

In general, a low antenna gain limits coverage range in those scenarios, such as rural areas, where effect of thermal noise is predominant over inter-cell interference.

A larger antenna gain is then beneficial for reducing digital divide because it potentially enables provision of high data rate connections in areas not reached by fixed Digital Subscriber Lines (DSL(s) or xDSL(s)).

Moreover, an advantage of using high gain directional antennas concerns the possibility to perform interference rejection in spatial domain by electronically shaping the radiation diagram of the antenna. This aspect is very important in urban areas characterized by high voice/data traffic where the main limiting factor for the achievable data rate is the inter-cell interference.

Performances of radio communication devices can be improved by providing them with multiple antennas that can be exploited in different ways depending on their characteristics, such as directionality, polarization, relative spacing, etc.

In particular, the simplest way to improve performances of radio communication devices is to use multiple omnidirectional antennas widely spaced apart in order to achieve a certain level of spatial diversity from fading. Signals from the different omnidirectional antennas can be recombined at baseband level by using a number of RF receivers equal to the number of receiving antennas.

A drawback of this solution is that one RF receiver is required for each antenna and thus the number of omnidirectional antennas that can be used in practice is rather limited.

Besides, small dimensions of the current radio communication devices, especially in case of portable radio communication devices such as USB plug-in dongles or mini-hubs, limit even further the number of, and the relative distance among, the antennas that can be integrated together. In particular, an undesired effect caused by a small distance between the antennas is an increase of fading correlation that limits the diversity level that can be achieved and, in case of Multiple Input Multiple Output (MIMO) transmission, makes not possible a parallel spatial multiplexing of multiple data streams.

A solution to the problem of having multiple RF receivers is provided by Applicant's international patent application WO2008064696.

In particular, WO2008064696 discloses a wireless communication system which is equipped with a switched-beam antenna comprising a certain number of directional antenna elements and wherein a sub-set of RF signals received from corresponding antenna elements is selected and combined into a single RF signal that is processed and demodulated in a single processing chain.

In particular, the wireless communication system disclosed by WO2008064696 comprises an RF phasing network for co-phasing the selected RF signals before combining them, and a processor for controlling RF signal combining and phasing in order to obtain a single RF signal having a Radio Performance Indicator (RPI) which satisfies predetermined conditions. The combination of the received RF signals is performed at radiofrequency by using a set of combining weights taken from a predefined set or codebook. According to WO2008064696, the minimum number of RF receivers is just equal to the number of transmitted data streams whatever the number of receiving antennas is.

OBJECT AND SUMMARY OF THE INVENTION

Therefore, the objective of the present invention is to provide an antenna device which can solve at least one of the above cited issues.

In particular, Applicants have tackled the problem of fading correlation among the receiving antennas. Another problem faced by Applicant is that of reducing antenna size specifically for applications in portable radio communication devices.

This objective is achieved by the present invention in that it relates to an antenna device and a communication device, as defined in the appended claims.

In particular, the present invention achieves the aforementioned objective by an antenna device comprising:
- a first antenna assembly configured to receive first radiofrequency signals polarized according to a first polarization;
- a second antenna assembly configured to receive second radiofrequency signals polarized according to a second polarization orthogonal to the first polarization; and
- a radiofrequency signal handling assembly coupled with the first and second antenna assemblies, and configured to handle the received first radiofrequency signals separately from the received second radiofrequency signals.

Said antenna device according to the present invention allows the problem of the fading correlation to be solved by the two antenna assemblies optimized for receiving orthogonal polarizations and by the radiofrequency signal handling assembly configured to handle separately the radiofrequency signals received by the two antenna assemblies. This feature makes the proposed antenna device suitable also for MIMO applications where multiple data streams are transmitted in parallel through spatial multiplexing.

Preferably, at least one of the antenna assemblies includes a plurality of printed antenna elements, and/or metamaterial-based antenna elements, and/or a plurality of antenna elements either omnidirectional, or directional.

More preferably, the first antenna assembly comprises a plurality of printed directional antenna elements and the second antenna assembly comprises a plurality of printed omnidirectional metamaterial-based antenna elements. In particular, the two antenna assemblies based on different technologies allow the problem of the limited space in current radio communication devices to be solved.

More and more preferably, the first antenna assembly comprises a plurality of first antenna elements configured to receive the first radiofrequency signals, the second antenna assembly comprises a plurality of second antenna elements operable to receive the second radiofrequency signals, and the radiofrequency signal handling assembly is configured to provide either a single output radiofrequency signal based on at least one received first radiofrequency signal and at least one received second radiofrequency signal, or a first output radiofrequency signal based on at least one received first radiofrequency signal and a second output radiofrequency signal based on at least one received second radiofrequency signal.

Conveniently, in order for the radiofrequency signal handling assembly to provide the single output radiofrequency signal, said radiofrequency signal handling assembly can be configured to:
  either weight and combine the first radiofrequency signals received by all the first antenna elements and the second radiofrequency signals received by all the second antenna elements to provide the single output radiofrequency signal;
  or select one or more of the first radiofrequency signal(s) received by the first antenna elements and/or one or more of the second radiofrequency signal(s) received by the second antenna elements, and
    weight and combine the selected first and second radiofrequency signals to provide the single output radiofrequency signal, or
    weight and combine the selected first radiofrequency signal(s) and the second radiofrequency signals received by all the second antenna elements to provide the single output radiofrequency signal, or
    weight and combine the first radiofrequency signals received by all the first antenna elements and the selected second radiofrequency signal(s) to provide the single output radiofrequency signal.

Conveniently, in order for the radiofrequency signal handling assembly to provide the first output radiofrequency signal, said radiofrequency signal handling assembly can be configured to:
  select a first radiofrequency signal received by one of the first antenna elements and provide said selected first radiofrequency signal as the first output radiofrequency signal; or
  select a subset of the first radiofrequency signals received by the first antenna elements, and weight and combine the selected first radiofrequency signals to provide the first output radiofrequency signal; or
  weight and combine the first radiofrequency signals received by all the first antenna elements to provide the first output radiofrequency signal.

Conveniently, in order for the radiofrequency signal handling assembly to provide the second output radiofrequency signal, said radiofrequency signal handling assembly can be configured to:
  select a second radiofrequency signal received by one of the second antenna elements and provide said selected second radiofrequency signal as the second output radiofrequency signal; or
  select a subset of the second radiofrequency signals received by the second antenna elements, and weight and combine the selected second radiofrequency signals to provide the second output radiofrequency signal; or
  weight and combine the second radiofrequency signals received by all the second antenna elements to provide the second output radiofrequency signal.

In particular, all the previously described strategies for selecting and/or weighting and combining the radiofrequency signals received by the two multi-element antenna assemblies provide the advantage that the number of radiofrequency transceivers is not constrained to be equal to the number of antenna elements and therefore a larger number of antenna elements can be used while keeping receiver complexity at acceptable levels.

BRIEF DESCRIPTION OF THE DRAWINGS

For a better understanding of the present invention, preferred embodiments, which are intended purely by way of example and are not to be construed as limiting, will now be described with reference to the attached drawings, wherein:
FIG. 7 shows in greater detail a first antenna element of the antenna device of FIG. 6;
FIG. 8 shows return loss and gain of the first antenna element of FIG. 7 when optimized for UMTS frequencies;
FIG. 9 shows in greater detail a second antenna element of the antenna device of FIG. 6.

DETAILED DESCRIPTION OF PREFERRED EMBODIMENTS OF THE INVENTION

Figure 1:
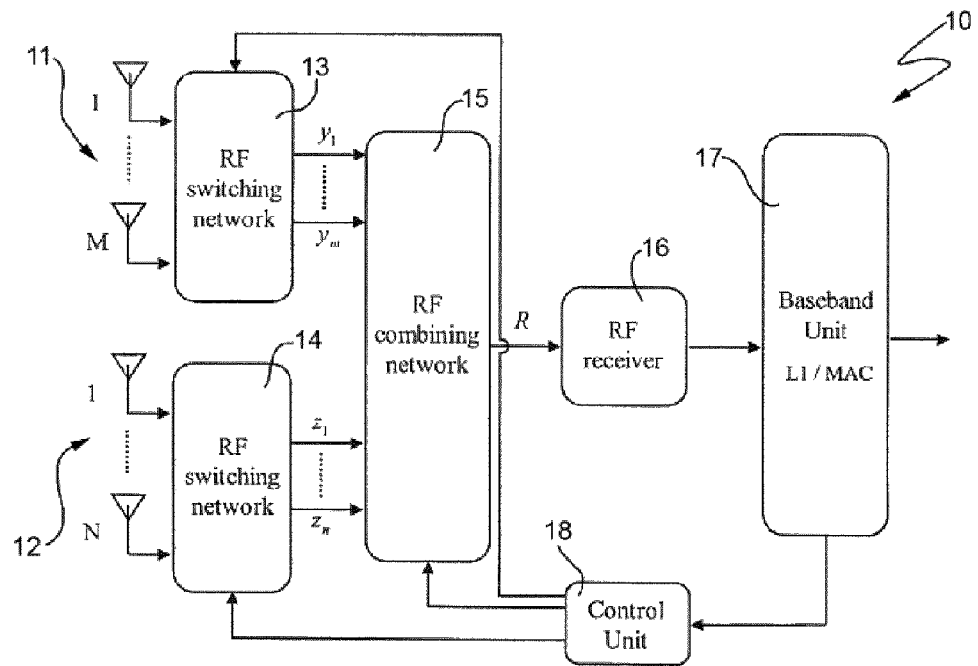
FIG. 1 schematically shows an antenna device according to a first embodiment of the present invention.

The following discussion is presented to enable a person skilled in the art to make and use the invention. Various modifications to the embodiments will be readily apparent to those skilled in the art, without departing from the scope of the present invention as claimed. Thus, the present invention is not intended to be limited to the embodiments shown, but is to be accorded the widest scope consistent with the principles and features disclosed herein and defined in the appended description and claims.

The present invention derives from Applicant's concept of combining two different antenna assemblies in a compact way thereby obtaining an antenna device having a very small shape factor with limited fading correlation among different antenna elements.

In particular, the two antenna assemblies are designed to receive orthogonal polarizations and an RF signal handling assembly is coupled with the two antenna assemblies to separately handle respective received RF signals so that the fading correlation can be kept very low despite the small dimensions of the antenna device.

Preferably at least one of the two antenna assemblies is a metamaterial-based antenna. In this connection, in the following a brief explanation of metamaterials will be presented for the sake of description clarity.

In particular, a metamaterial is an artificial material which exhibits, at specific frequencies, a negative permittivity $\in$ and a negative permeability $\mu$ In detail, a metamaterial comprises periodic structures with unitary cells having dimensions in the order of millimeters for microwave applications. Metamaterials have allowed new antenna types to be conceived by exploiting phase compensation.

In greater detail, the propagation of electromagnetic waves in most materials obeys the right handed rule for the (E, H, β) vector fields, where E is the electrical field, H is the magnetic field, and β is the wave vector. The phase velocity direction is the same as the direction of the signal energy propagation (group velocity) and the refractive index is a positive number. Such materials are "Right Handed" (RH). Most natural materials are RH materials. Artificial materials can also be RH materials.

A metamaterial has an artificial structure. When designed with a structural average unit cell size p much smaller than the wavelength of the electromagnetic energy guided by the metamaterial, the metamaterial can behave like a homogeneous medium to the guided electromagnetic energy. Unlike RH materials, a metamaterial can exhibit a negative refractive index with permittivity $\in$ and permeability $\mu$ being simultaneously negative, and the phase velocity direction is opposite to the direction of the signal energy propagation where the relative directions of the (E, H, β) vector fields follow the left handed rule. Metamaterials that support only a negative index of refraction with permittivity $\in$ and permeability $\mu$ being simultaneously negative are "Left Handed" (LH) metamaterials. Many metamaterials are mixtures of LH metamaterials and RH materials and thus are Composite Left and Right Handed (CRLH) metamaterials. A CRLH metamaterial can behave like a LH metamaterial at low frequencies and a RH material at high frequencies. Designs and properties of various CRLH metamaterials are described in Caloz and Itoh, "*Electromagnetic Metamaterials: Transmission Line Theory and Microwave Applications*", John Wiley & Sons (2006). CRLH metamaterials and their applications in antennas are described by Tatsuo Itoh in "*Invited paper: Prospects for Metamaterials*", Electronics Letters, Vol. 40, No. 16 (August, 2004).

CRLH metamaterials can be structured and engineered to exhibit electromagnetic properties that are tailored for specific applications and can be used in applications where it may be difficult, impractical or infeasible to use other materials. In addition, CRLH metamaterials may be used to develop new applications and to construct new devices that may not be possible with RH materials.

Going back to the detailed description of the present invention, preferably the two antenna assemblies are made with different technologies. In particular, a first antenna assembly can be a printed antenna comprising a first number of first antenna elements printed on a first dielectric substrate and arranged so as to receive RF signals polarized according to a first polarization, while a second antenna assembly can comprise a second number of second antenna elements that are metamaterial-based monopoles printed on a second dielectric substrate (i.e., printed on the second dielectric substrate exploiting the metamaterial technique) and are intended in use to be arranged so as to receive RF signals polarized according to a second polarization orthogonal to the first polarization.

Preferably, the first antenna elements are intended in use to be arranged so as to receive RF signals with horizontal polarization, and the metamaterial-based monopoles are intended, during a communication, to be oriented so as to receive RF signals with vertical polarization. In particular, the metamaterial-based monopoles are intended, during a communication, to be oriented vertically.

Conveniently, the first dielectric substrate can be, for example, a circular disc with four first antenna elements printed thereon, which circular disc is intended in use to be arranged horizontally so that the first antenna elements receive RF signals with horizontal polarization. This is only an example, while a different shape of the first dielectric substrate and a different number of the first antenna elements can be used without departing from the scope of the present invention.

Conveniently, the metamaterial-based monopoles have a layout such to realize a compact cell, such as a CRLH cell. This type of technology permits a significant reduction in the monopole height with respect to a conventional printed monopole.

The use of two antenna assemblies optimized for receiving different polarizations mitigates the problem of fading correlation, as orthogonal polarizations generally exhibit low cross-correlation levels, and improves the diversity level achievable at the receiver. The utilization of two separate antenna assemblies with different orientation (horizontal and vertical) facilitates also the design of compact wireless communication devices.

In this connection, for example, an antenna device according to a preferred embodiment of the present invention can conveniently comprise:
  a cylindrical case comprising a first base including a first dielectric substrate, and a lateral surface including one or more second dielectric substrate(s);
  the first antenna elements printed on the first dielectric substrate, i.e., arranged on the first base of the cylindrical case;
  the second antenna elements realized with metamaterials and printed on the second dielectric substrate(s), i.e., arranged on the lateral surface of the cylindrical case; and
  an electronic circuitry (RF and baseband) for radio functionalities housed within the cylindrical case.

In use, the antenna device is intended to be rested on the first base so that the first antenna elements are horizontally oriented and the second antenna elements are vertically oriented.

Alternatively to the second antenna elements arranged on the lateral surface of the cylindrical case, said second antenna elements can be rotatably mounted on the second base of the cylindrical case by means of rotating joints operable to rotate said second antenna elements so that they are vertically oriented during a communication, while they are kept horizontal when the antenna device is not active.

A further aspect of the present invention concerns several schemes for selecting and combining the RF signals received by the different antenna elements.

In particular, the antenna elements of the first and second antenna assemblies are connected to an RF signal handling assembly including at least one RF switching network operable to select a predefined subset of said antenna elements.

In detail, each antenna assembly can be connected to a respective RF switching network or a single RF switching network can be used for both the antenna assemblies.

Moreover, in use, the RF signals received by the selected antenna elements are weighted in at least one RF weighting network comprising configurable phase shifters that insert in said RF signals a phase shift quantized over a certain set of values. After the phase shift weighting, the RF signals from the selected antenna elements are combined at radiofrequency by a combining unit and input to one or more RF receiver(s) for demodulation.

The RF signals to be selected and the phase shift weights are determined by a control unit that controls operation of the RF switching network(s) and of the RF weighting network(s). In particular, in use, the control unit receives as input radio performance indicators measured by a baseband unit of the receiver. On the basis of these measurements the control unit determines the best antenna element(s) to be selected and optimum weights that maximize the radio performance under the current channel conditions. The radio performance indicators measured by the baseband unit and input to the control unit can conveniently be: the Received Signal Strength Indicator (RSSI), the average Medium Access Control (MAC) throughput, the packet BLock Error Rate (BLER), the Signal to Interference plus Noise Ratio (SINR), the Channel Quality Indicator (CQI) measured by a user terminal, etc. These are just example, while other radio performance metrics can be measured and advantageously exploited without departing from the scope of the present invention.

In order to describe the present invention in greater detail, a functional block diagram of an antenna device 10 according to a first embodiment of the present invention is shown in FIG. 1, namely in the case of a receiver equipped with a single RF demodulation chain.

In particular, the antenna device 10 shown in FIG. 1 comprises:
- a first antenna assembly 11 including M first antenna elements configured to receive horizontally polarized RF signals, M being an integer higher than zero;
- a second antenna assembly 12 including N second antenna elements made from metamaterials and configured to receive vertically polarized RF signals, N being an integer higher than zero;
- a first RF switching network 13 coupled with the first antenna assembly 11, and operable to select m first RF signals among the RF signals received by said first antenna assembly 11, where $1 \leq m \leq M$;
- a second RF switching network 14 coupled with the second antenna assembly 12, and operable to select n second RF signals among the N RF signals received by said second antenna assembly 12, where $1 \leq n \leq N$;
- a single RF combining network 15 coupled with the first RF switching network 13 to receive therefrom the first selected RF signals and with the second RF switching network 14 to receive therefrom the second selected RF signals, and operable to weight and combine said first and second selected RF signals so as to generate and output a single combined signal R;
- an RF receiver 16 coupled with the single RF combining network 15 to receive therefrom the single combined signal R, and configured to process said single combined signal R so as to output a processed signal;
- a baseband unit 17 coupled with the RF receiver 16 to receive therefrom the processed signal, and configured to determine one or more radio performance indicator(s) on the basis of said processed signal; and
- a control unit 18 coupled with the baseband unit 17 to receive therefrom the determined radio performance indicator(s), and with the first 13 RF switching network, the second RF switching network 14 and the single RF combining network 15 to control their operation on the basis of said determined radio performance indicator(s).

In detail, denoting as $y_i$, where $1 \leq i \leq m$, the first selected RF signals from the first RF switching network 13 and as $z_l$, where $1 \leq l \leq n$, the second selected RF signals from the second RF switching network 14, the weighting and combination operation performed by the single RF combining network 15 can be mathematically expressed as follows:

$$R = \sum_{i=1}^{m} w_i y_i + \sum_{l=1}^{n} w_l z_l, \qquad (1)$$

where $w_i$ and $w_l$ denote combining weights for, respectively, the first and second selected RF signals.

Preferably, the combining weights $w_i$ and $w_l$ are designed as pure phase shifts and thus can be mathematically expressed as $w_i = e^{j\Phi_i}$ and $w_l = e^{j\Phi_l}$. The weighting operation can be conveniently realized at radiofrequency by causing each selected RF signal to propagate on a transmission line stub of appropriate length such that the output signal is subject to a desired phase shift. In order to limit circuitry complexity, the combining weights can be conveniently quantized over a finite number of values so that a limited number of transmission line stubs are to be implemented.

In this connection, for example, a quaternary set of combining weight values can be conveniently implemented, namely corresponding to phase shifts of 0°, 90°, 180° and 270°, which phase shifts, in turn, correspond to the following sets of combining weights:

$$w_i \in \left\{ \frac{1}{\sqrt{2}}, \frac{j}{\sqrt{2}}, -\frac{1}{\sqrt{2}}, -\frac{j}{\sqrt{2}} \right\}$$

$$w_l \in \left\{ \frac{1}{\sqrt{2}}, \frac{j}{\sqrt{2}}, -\frac{1}{\sqrt{2}}, -\frac{j}{\sqrt{2}} \right\}.$$

The set of combining weights can conveniently include also the special value zero for RF signals not selected, i.e., discarded, by the RF switching networks 13 and 14.

Figure 2:
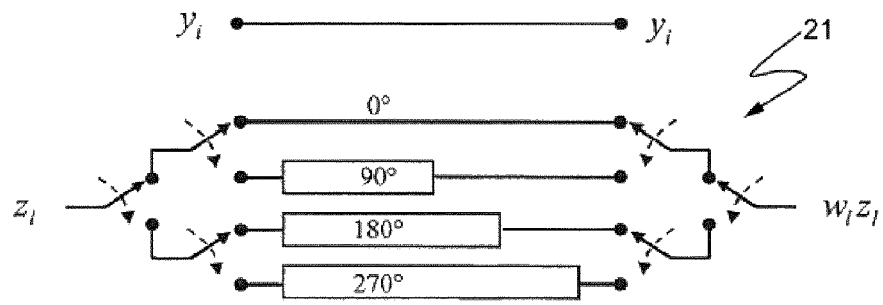
FIGS. 2 and 3 show two exemplary embodiments of a weighting unit of the antenna device of FIG. 1.
Figure 3:
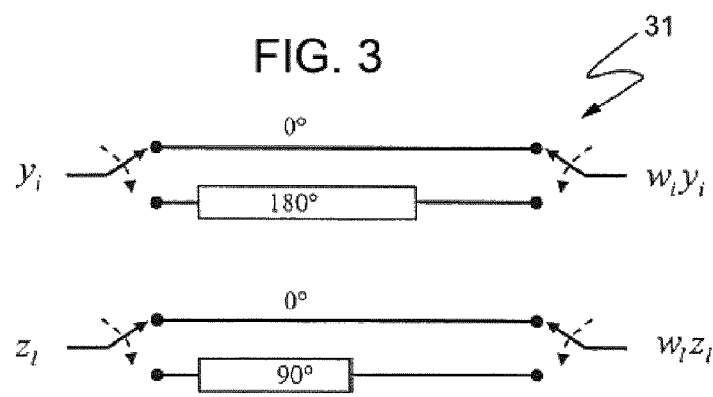

FIGS. 2 and 3 schematically show two exemplary implementations 21 and 31 of a RF weighting unit preferably included by the single RF combining network 15. In particular, as shown in FIGS. 2 and 3, each weighting unit comprises a respective set of transmission line stubs of different length that are selectable by means of switches. In detail, in use, each weighting unit is fed, at input, with the selected RF signals $y_i$ and $z_l$, and outputs the same RF signals but with the required relative phase shift. The two weighted RF signals are then combined at radiofrequency, i.e., added, and input to the RF receiver 16.

Figure 4:
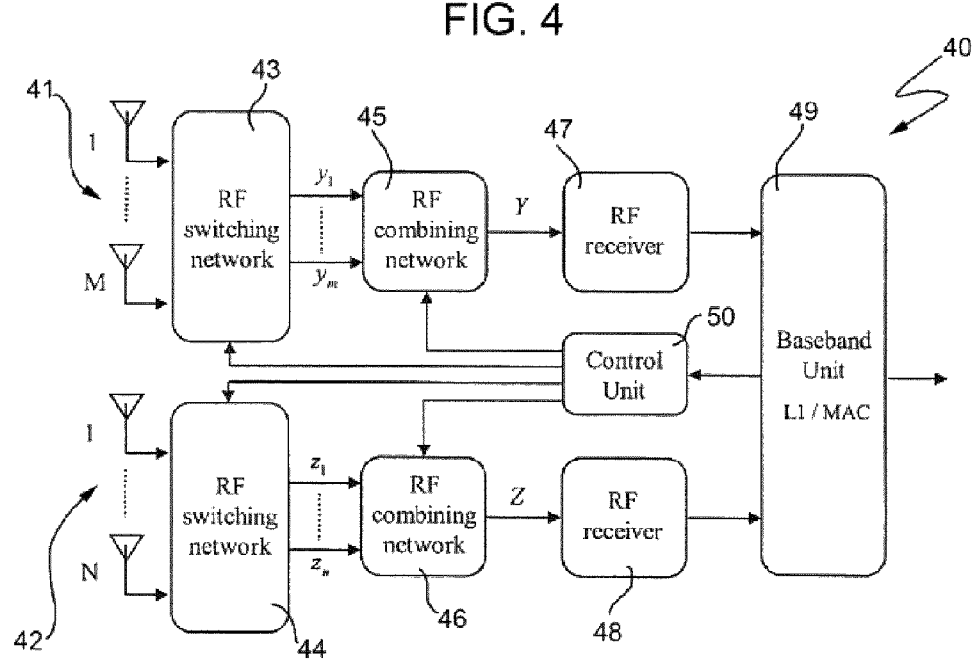
FIG. 4 schematically shows an antenna device according to a second embodiment of the present invention.

Furthermore, FIG. 4 shows a functional block diagram of an antenna device 40 according to a second embodiment of the present invention, namely in the case of a receiver equipped with two RF demodulation chains.

In particular, the antenna device 40 shown in FIG. 4 comprises:
- a first antenna assembly 41 including M first antenna elements configured to receive horizontally polarized RF signals, M being an integer higher than zero;

a second antenna assembly 42 including N second antenna elements made with metamaterials and configured to receive vertically polarized RF signals, N being an integer higher than zero;

a first RF switching network 43 coupled with the first antenna assembly 41, and operable to select m first RF signals among the RF signals received by said first antenna assembly 41, where 1≤m≤M;

a second RF switching network 44 coupled with the second antenna assembly 42, and operable to select n second RF signals among the N RF signals received by said second antenna assembly 42, where 1≤n≤N;

a first RF combining network 45 coupled with the first RF switching network 43 to receive therefrom the first selected RF signals, and operable to weight and combine said first selected RF signals so as to generate and output a first combined signal Y;

a second RF combining network 46 coupled with the second RF switching network 44 to receive therefrom the second selected RF signals, and operable to weight and combine said second selected RF signals so as to generate and output a second combined signal Z;

a first RF receiver 47 coupled with the first RF combining network 45 to receive therefrom the first combined signal Y, and configured to process said first combined signal Y so as to output a first processed signal;

a second RF receiver 48 coupled with the second RF combining network 46 to receive therefrom the second combined signal Z, and configured to process said second combined signal Z so as to output a second processed signal;

a baseband unit 49 coupled with the first RF receiver 47 to receive therefrom the first processed signal and with the second RF receiver 48 to receive therefrom the second processed signal, and configured to determine one or more radio performance indicator(s) on the basis of said first and second processed signals; and a control unit 50 coupled with the baseband unit 49 to receive therefrom the determined radio performance indicator(s), and with the first RF switching network 43, the second RF switching network 44, the first RF combining network 45 and the second RF combining network 46 to control their operation on the basis of said determined radio performance indicator(s).

In an alternative embodiment, the antenna device 40, instead of the two RF switching networks 43 and 44, can conveniently comprise a single RF switching network for selecting the RF signals from both the antenna assemblies 41 and 42.

In detail, according to the notation previously explained and used, the first combined RF signal Y can be mathematically expressed as $$Y = \sum_{i=1}^{m} w_i y_i, \quad (2)$$

and the second combined RF signal Z can be mathematically expressed as $$Z = \sum_{l=1}^{n} w_l z_l. \quad (3)$$

As previously described, a subset of the M and N received RF signal is selected and provided to the combining unit(s) of the RF combining network(s). In the simplest case only one RF signal is selected, which corresponds to the best receiving antenna element for the respective polarization. In such a case, the combining weights $w_i$ and $w_l$ can conveniently be all equal to zero except the one that corresponds to the best receiving antenna element for each polarization, and the equations (2) and (3) can be conveniently simplified as follows:

$$Y = y_i, \quad (4)$$

$$Z = z_l. \quad (5)$$

Figure 5:
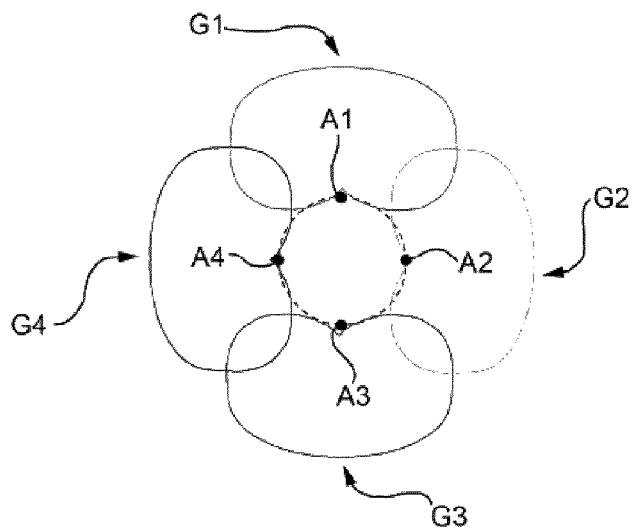
FIG. 5 schematically shows four directional antenna elements along with the corresponding radiation diagrams according to an aspect of the present invention.

The selection of only one RF signal applies, for example, when the antenna elements are directional and thus have a significant gain. The different antenna elements of each antenna assembly are conveniently arranged so as to have a minimum overlap between the corresponding radiation diagrams and to ensure a good reception for all possible directions of arrival in the plane corresponding to the respective specific polarization, as schematically illustrated in FIG. 5 where four antenna elements A1, A2, A3 and A4 are shown along with sketched corresponding radiation diagrams G1, G2, G3 and G4.

On the contrary, in the hardest case, the RF signals from all the M and N antenna elements are selected and thus all the combining weights $w_i$ and $w_l$ have values different than zero. This second case applies when the antenna elements are designed as omnidirectional dipoles with zero gain in the plane corresponding to the desired polarization. In this case, the different antenna elements operate like an array and thus the antenna directionality can be ensured by a proper combination of all the received RF signals. Moreover, in this case, the antenna elements are preferably arranged so that the distance d between any pair of adjacent antenna elements is lower than, or equal to, half wavelength λ/2, i.e., d≤λ/2, so that a radiation diagram with predictable shape and without grating lobes can be formed, λ being the operating wavelength for which the antenna device is designed. For example, in case of an antenna device designed to operate in the 2 GHz band, i.e., λ≈15 cm, the distance d between any pair of adjacent antenna elements should preferably be lower than, or equal to, 7.5 cm. Conveniently, the diameter of the dielectric substrates of the antenna device can be in the order of 10 cm.

In a more general case, only a subset of the M and N received RF signals is selected by the RF switching network(s), said subset comprising m RF signals from the first antenna assembly and n RF signals from the second antenna assembly. In this case, the m and n selected RF signals are combined according to the equation (1) if only one RF combining network is provided, or according to the equations (2) and (3) if two RF combining networks are provided. After the combination, the single combined signal R, or the first combined signal Y and the second combined signal Z, is/are input to the RF receiver(s) that perform frequency down-conversion, filtering, and Analog to Digital (A/D) conversion. Then, the digital signals from the RF receiver(s) are processed by the baseband (BB) unit that performs all the Layer 1 and Layer 2 operations related to the physical and MAC protocol layers. Examples of digital signal processing operations performed by the BB unit are: demodulation, symbol-to-bit demapping, channel decoding, signal combining, radio measurements, etc.

The selection of the best antenna elements and the determination of the optimum combining weights is performed by the Control Unit (CU). The CU receives from the BB unit a set of measurements being indicative of instantaneous radio channel conditions. As previously stated, examples of measurements that can be conveniently used for RF signal selection and combining weight determination are the RSSI(s), the BLER(s) of the received data packets, the average throughput measured at MAC level, the SINR, etc. In use, the CU periodically scans the different antenna elements and combining weights in order to identify the configuration that ensures the best reception performance. In case of a packet data communication, the scan operation can be conveniently performed during the idle intervals, for example during the reading time of a web page. In case of a circuit-switched connection, such as a voice or video call, the scan operation can be preferably performed so as to minimize the probability of dropping off the connection and to limit any degradation of the Quality of Service (QoS) perceived by the user. For example, this can be conveniently performed by activating the scan operation at different time intervals for the first and second antenna assembly.

Figure 6:
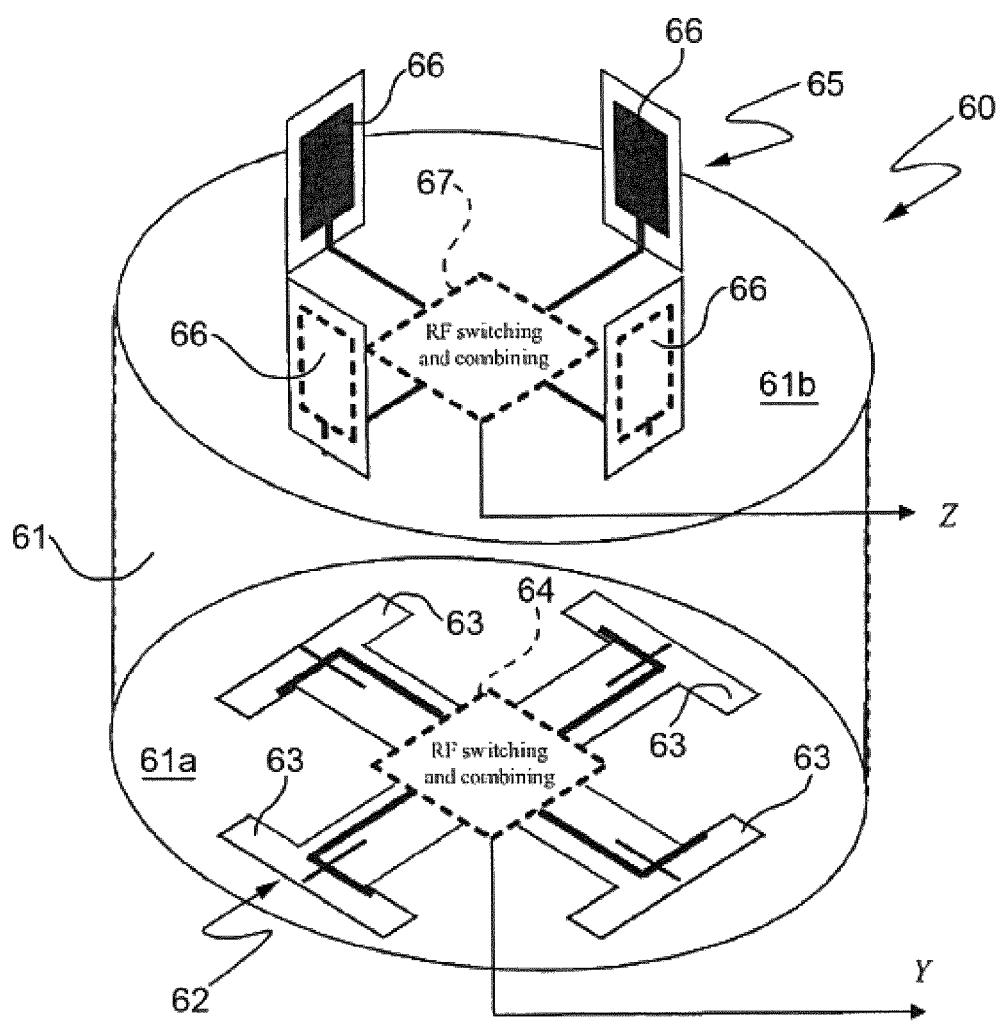
FIG. 6 schematically shows an antenna device according to a specific preferred embodiment of the present invention.

Furthermore, FIG. 6 schematically shows an antenna device 60 according to a specific preferred embodiment of the present invention, namely in the case of a receiver equipped with two RF demodulation chains.

In particular, the antenna device 60 shown in FIG. 6 comprises:
  a cylindrical case 61;
  a first antenna assembly 62 including four (i.e., M=4) directional printed antenna elements 63 arranged on a first base 61a of the cylindrical case 61 and optimized for receiving horizontally polarized signals;
  a first RF switching and combining assembly 64 coupled with the first antenna assembly 62 to select and combine the RF signals received by said first antenna assembly 62 so as to output a first combined RF signal Y;
  a second antenna assembly 65 including four (i.e., N=4) printed omnidirectional metamaterial-based monopoles 66, mounted on a second base 61b of the cylindrical case 61, and operable to receive vertically polarized signals; and
  a second RF switching and combining assembly 67 coupled with the second antenna assembly 65 to select and combine the RF signals received by said second antenna assembly 65 so as to output a second combined RF signal Z.

FIG. 7 shows in greater detail one of the directional printed antenna elements 63 of the first antenna assembly 62 arranged on the first base 61a of the cylindrical case 61.

In particular, the directional printed antenna element 63 shown in FIG. 7 comprises:
  an active dipole 71 that is $\lambda/2$ long, has a T-shaped structure, and, in use, is excited by a microstrip 72 which perpendicularly crosses a slot 73 formed in the active dipole 71, and terminates with an open circuit;
  a passive dipole 74, also called director, arranged before the active dipole 71 and used to improve gain and directivity of the antenna element 63; and
  a planar reflector 75 which is a metalized zone inserted behind the active dipole 71 to control front-to-back radiation.

In detail, the slot line 73 is about $\lambda/4$ long and operates as a balun, namely a circuit that transforms an unbalanced structure of the feeding line into a balanced one (dipoles). This type of antenna element is easy to design, because the input matching to 50 ohm is obtained by optimizing basically only two parameters: the distance of the microstrip 72 from the top and the length of a stub 76 which is the microstrip portion exceeding the slot 73. The first parameter controls mostly the real part of the input impedance and the second the imaginary part. In this connection, as an example, computed and measured return loss and gain of a printed dipole antenna optimized for UMTS frequencies are reported in FIG. 8. As shown in FIG. 8, the obtainable bandwidth (15 dB) is more than 30%, the gain is of the order of 4 dB, and the front-to-back exceeds 10 dB.

In order for the directional printed antenna elements 63 to receive horizontally polarized RF signals, during operation the antenna device 60 is to be rested on the first base 61a of the cylindrical case 61. Preferably, the gain of each directional printed antenna element 63 is in the order of 4-6 dB.

Conveniently, according to a first preferred embodiment of the first RF switching and combining assembly 64, only the best directional printed antenna element 63 of the first antenna assembly 62 is selected and the corresponding received RF signal is provided to an RF receiver according to the equation (4) (wherein index i identifies the selected best directional printed antenna element 63). According to said first preferred embodiment of the first RF switching and combining assembly 64, the RF switching network is reduced to a 4-by-1 selector and the combination operation is not necessary as a single RF signal is selected.

Instead, according to a second preferred embodiment of the first RF switching and combining assembly 64, the two best directional printed antenna elements 63 can be conveniently selected and the corresponding RF received signals can be conveniently combined with proper combining weights according to the equation (2) (wherein m=2 and index i indexes the two best directional printed antenna elements 63 selected). According to said second preferred embodiment of the first RF switching and combining assembly 64, it is possible to exploit two different paths coming from different directions by combining their energy at radiofrequency.

Furthermore, FIG. 9 shows in greater detail one of the metamaterial-based monopoles 66 of the second antenna assembly 65 mounted on the second base 61b of the cylindrical case 61.

In particular, the metamaterial-based monopole 66 shown in FIG. 9 has substantially a rectangular shape, is structured to form a CRLH metamaterial cell, and comprises:
  an interdigital capacitor 91, properly positioned along the metamaterial-based monopole 66;
  two inductive branches 92 connected to the ground and laterally positioned with respect to the interdigital capacitor 91; and
  an input microstrip RF feeding line 93.

The main advantage realized by this structure is a significant reduction of the monopole length with respect to a classical monopole, operating over the same frequency band. In use, in particular during a communication, the printed omnidirectional metamaterial-based monopoles 66 are vertically oriented so that they receive RF signals with vertical polarizations. In order to reduce the size of the antenna device 60, the printed omnidirectional metamaterial-based monopoles 66 can be conveniently mounted on the second base 61b of the cylindrical case 61 by means of rotating joints (not shown in FIGS. 6 and 9) so that, when the antenna device 60 is not powered or when a voice/data communication is not active, they are arranged parallelly to the second base 61b of the cylindrical case 61, while, when the antenna device 60 is powered or when a voice/data communication is active, they are rotated so as to be perpendicular to the second base 61*b* of the cylindrical case 61.

Figure 10:
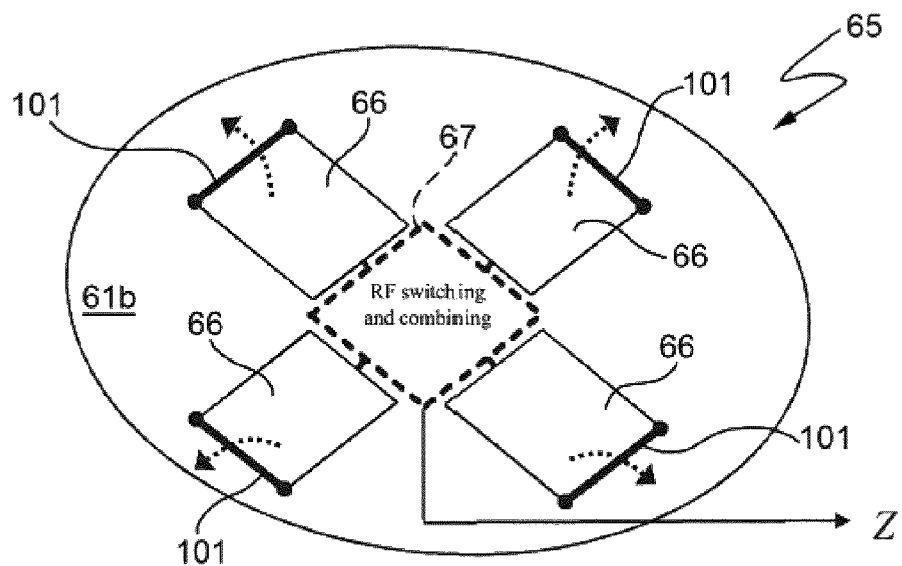
FIGS. 10 and 11 show two different arrangements of an antenna assembly of the antenna device of FIG. 6 corresponding to two different operating conditions of the antenna device.

In this connection, FIG. 10 shows the printed omnidirectional metamaterial-based monopoles 66 of the second antenna assembly 65 when the antenna device 60 is off or when a voice/data communication is not active (i.e., the antenna device 60 is idle). In particular, FIG. 10 shows the printed omnidirectional metamaterial-based monopoles 66 arranged parallelly to the second base 61*b* of the cylindrical case 61. In FIG. 10 also the rotating joints are shown and they are denoted by reference numbers 101.

Figure 11:
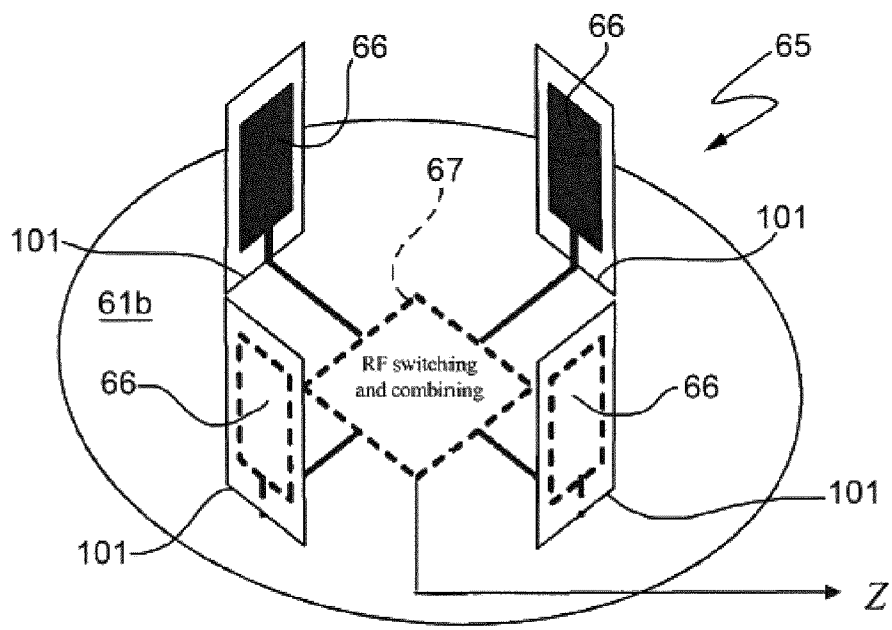

Moreover, FIG. 11 shows the printed omnidirectional metamaterial-based monopoles 66 when the antenna device 60 is on or when a voice/data communication is ongoing. In particular, FIG. 11 shows the printed omnidirectional metamaterial-based monopoles 66 arranged perpendicularly to the second base 61*b* of the cylindrical case 61.

Conveniently, the positioning of the printed omnidirectional metamaterial-based monopoles 66 can be done manually by a user or can be assisted by a mechanical or electric automated mechanism (not shown in FIGS. 10 and 11).

According to a preferred embodiment of the second RF switching and combining assembly 67, the RF signals received by the four printed omnidirectional metamaterial-based monopoles 66 are preferably combined according to the equation (3) (wherein n=N=4 and index/indexes the four printed omnidirectional metamaterial-based monopoles 66) with a proper set of combining weights that shape the radiation diagram so as to maximize radio performances. According to said preferred embodiment of the second RF switching and combining assembly 67, all the received RF signals are selected and thus an RF switching network for signal selection is not necessary.

Figure 12:
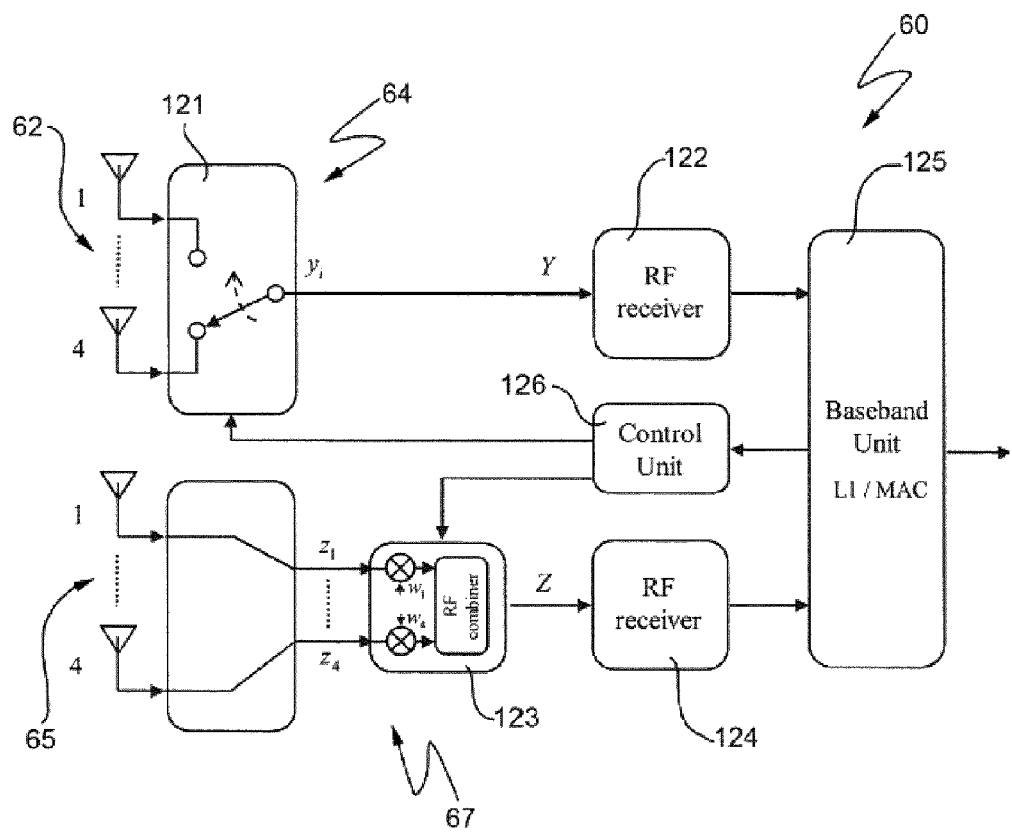
FIG. 12 schematically shows the antenna device of FIG. 6 wherein two components are realized each according to a respective preferred embodiment.

Furthermore, FIG. 12 shows a functional block diagram of the antenna device 60 comprising the first RF switching and combining assembly 64 implemented according to the previously described first preferred embodiment thereof, and the second RF switching and combining assembly 67 implemented according to the previously described preferred embodiment thereof.

In particular, as shown in FIG. 12, the first RF switching and combining assembly 64 comprises a 4-by-1 RF switching network 121 operable to select the RF signal received by only one directional printed antenna element 63, and does not comprise any RF combining network or unit. In use, the RF signal $Y=y_i$ selected by the 4-by-1 RF switching network 121 is input to a first RF receiver 122.

Again as shown in FIG. 12, the second RF switching and combining assembly 67 does not comprise any RF switching network, but comprises an RF combining network 123 operable to combine the RF signals received by all the four printed omnidirectional metamaterial-based monopoles 66 so as to generate a combined RF signal Z according to the equation (3) (wherein n=N=4 and index/indexes the four printed omnidirectional metamaterial-based monopoles 66). In use, the RF signals received by all the four printed omnidirectional metamaterial-based monopoles 66 are combined by the RF combining network 123 by means of a set of combining weights $\{w_i\}$ in order to shape a desired radiation diagram, and the resulting combined RF signal Z is input to a second RF receiver 124.

FIG. 12 shows also:

a baseband unit 125 coupled with the first 122 and second 124 RF receivers to receive the signals outputted by said first 122 and second 124 RF receivers, and configured to determine one or more radio performance indicator(s) on the basis of the received signals; and a control unit 126 coupled with the baseband unit 125 to receive therefrom the determined radio performance indicator(s), and with the 4-by-1 RF switching network 121 and the RF combining network 123 to control their operation on the basis of the received radio performance indicator(s).

Figure 13:
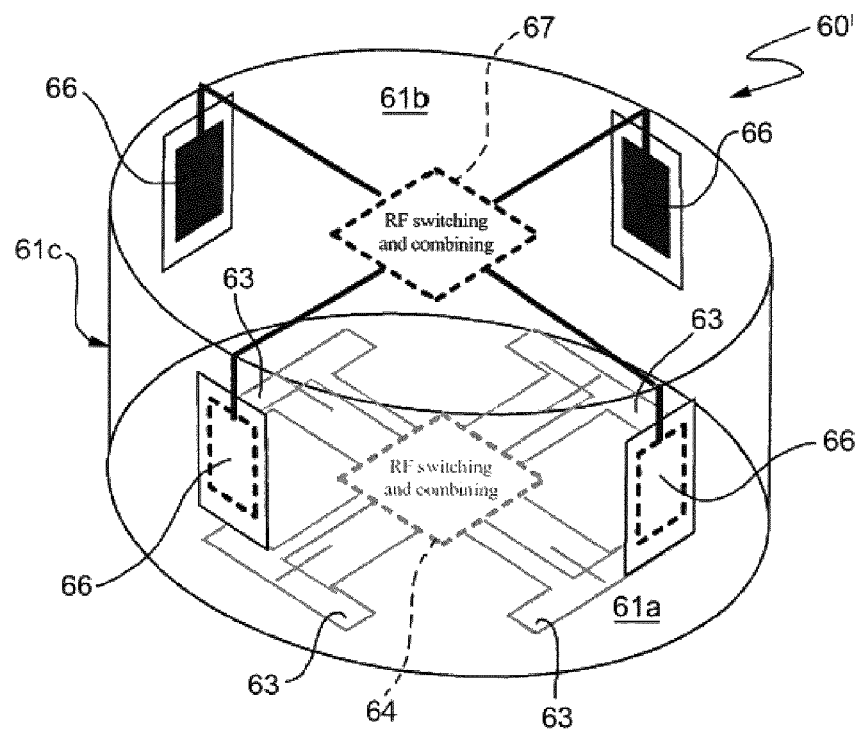
FIG. 13 schematically shows the antenna device of FIG. 6 realized according to an alternative preferred embodiment of the present invention.

According to an alternative embodiment of the antenna device 60, which alternative embodiment is shown in FIG. 13 wherein it is denoted as 60', the printed omnidirectional metamaterial-based monopoles 66 of the second antenna assembly 65 are arranged on a lateral surface 61*c* of the cylindrical case 61, which houses electronic circuitry for wireless connectivity. As shown in FIG. 13, the first antenna assembly 62 is always arranged on the lower base 61*a* of the cylindrical case 61.

Figure 14:
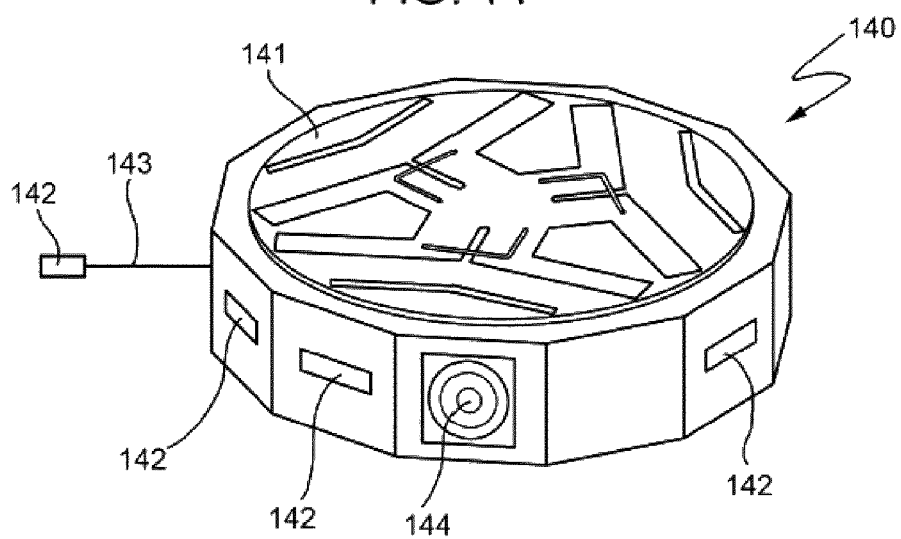
FIG. 14 shows a wireless communication device comprising an antenna device according to the present invention.

Finally, FIG. 14 shows an antenna device 141 according to the present invention integrated in a multi-purpose wireless communication device 140 including:

electronic circuitry for wireless connectivity (not shown in FIG. 14);

several USB and Secure Digital (SD) ports 142 for connecting the wireless communication device 140 to other equipments (e.g. consumer electronic equipments), some of said ports 142 being connected to the wireless communication device 140 via an extensible cable 143 (e.g. wrapped up in a spool); and a webcam 144 and/or other peripherals that enable the provision of Value Added Services (VAS).

In summary, the present invention concerns a new antenna device having a very small form factor that strongly facilitates its integration in portable wireless communication devices. In particular, the antenna device can be a separate device externally connectable to a commercial wireless communication device, such as a USB plug-in dongle or a wireless router, or can be integrated in a complete wireless communication device including also electronic circuitry (i.e., RF and baseband chipsets) necessary to provide wireless connectivity.

The problem of the fading correlation is addressed by designing the two antenna assemblies so that the radiating elements of the first and second antenna assemblies are optimized for receiving different polarizations. This feature makes the proposed antenna device suitable also for MIMO applications where multiple data streams are transmitted in parallel through spatial multiplexing.

The problem of the limited space in current radio communication devices is addressed by integrating two different antenna assemblies based on different technologies, each antenna comprising a given number of radiating elements.

Moreover, a further aspect of the present invention concerns also several schemes for selecting and combining at radiofrequency the signals received by the different antenna elements. The RF processing of the received signals provides the advantage that the number of RF transceivers is not constrained to be equal to the number of antenna elements and therefore a larger number of antenna elements can be used while keeping the receiver complexity at acceptable levels.

The advantages of the present invention are clear from the foregoing.

In particular, the antenna device according to the present invention allows reducing the antenna size making possible the realization of high-performance compact wireless communication devices.

Finally, it is clear that numerous modifications and variants can be made to the present invention, all falling within the scope of the invention, as defined in the appended claims.

The invention claimed is:

1. An antenna device comprising:
   a first antenna assembly comprising a plurality of printed directional antenna elements configured to receive first radiofrequency signals polarized according to a first polarization;
   a second antenna assembly comprising a plurality of printed omnidirectional metamaterial-based antenna elements configured to receive second radiofrequency signals polarized according to a second polarization orthogonal to the first polarization; and
   a radiofrequency signal handling assembly coupled with the first and second antenna assemblies, and configured to
      handle the received first radiofrequency signals separately from the received second radiofrequency signals; and
      provide either a single output radiofrequency signal based on at least one received first radiofrequency signal and at least one received second radiofrequency signal, or a first output radiofrequency signal based on at least one received first radiofrequency signal and a second output radiofrequency signal based on at least one received second radiofrequency,
   wherein the radiofrequency signal handling assembly comprises:
   a first switching network coupled with the first antenna assembly, and configured to select a subset of the first radiofrequency signals received by the printed directional antenna elements;
   a second switching network coupled with the second antenna assembly, and configured to select a subset of the second radio frequency signals received by the printed omnidirectional metamaterial-based antenna elements;
   at least one combining network coupled with at least one of the first and second switching networks to receive, as incoming signals, the radiofrequency signals selected by the at least one of the first and second switching networks, and configured to weight the incoming signals and to combine the weighted incoming signals into the single output radiofrequency signal or into at least one of the first and second output radio frequency signals; and
   a controller coupled with at least one of the first and second switching networks and the at least one combining network configured to control selection performed by the at least one of the first and second switching networks and weighting performed by the at least one combining network on the basis of at least one radio performance indicator based on at least one previously provided single output radiofrequency signal or based on at least one previously provided first output radio frequency signal and at least one previously provided second output radio frequency signal.

2. The antenna device of claim 1, wherein the radiofrequency signal handling assembly comprises:
   a single said combining network which is configured to weight the incoming signals and to combine the weighted incoming signals into the single output radiofrequency signal.

3. The antenna device of claim 2, wherein
   the controller is configured to control selection performed by the first and second switching networks and weighting performed by the single combining network on the basis of at least one radio performance indicator based on at least one previously provided single output radiofrequency signal.

4. The antenna device of claim 1, wherein the at least one combining network comprises:
   a first combining network coupled with the first switching network to receive, as first incoming signals, the first radiofrequency signals selected by the first switching network, and configured to weight the first incoming signals and to combine the weighted first incoming signals into the first output radiofrequency signal;
   a second combining network coupled with the second switching network to receive, as second incoming signals, the second radiofrequency signals selected by the second switching network, and configured to weight the second incoming signals and to combine the weighted second incoming signals into the second output radiofrequency signal.

5. The antenna device of claim 1, wherein
   the first switching network is configured to select one of the first radiofrequency signal received by the plurality of printed directional antenna elements and to provide the selected first radiofrequency signal as the first output radiofrequency signal; and
   the at least one combining network comprises a combining network coupled with the second antenna assembly to receive, as incoming signals, the second radiofrequency signals received by the plurality of printed omnidirectional metamaterial-based antenna elements, and configured to weight the incoming signals and to combine the weighted incoming signals into the second output radiofrequency signal.

6. The antenna device according to claim 4, wherein
   the controller is configured to control selection performed by the switching network and weighting performed by the combining networks on the basis of at least one radio performance indicator based on at least one previously provided first output radiofrequency signal and at least one previously provided second radiofrequency signal.

7. The antenna device according to claim 2, wherein each combining network is configured to weight the respective incoming signals by applying to each respective incoming signal a corresponding phase shift.

8. The antenna device of claim 7, wherein the phase shifts are applied by a plurality of delay lines selectively switched.

9. The antenna device according to claim 1, further comprising:
   an antenna case housing the radiofrequency signal handling assembly, wherein
   the first antenna assembly and the second antenna assembly are arranged on the antenna case to receive, respectively, the first and second radiofrequency signals.

10. The antenna device of claim 9, wherein at least one of the antenna assemblies comprises a plurality of antenna elements arranged on the antenna case so that that a distance between each pair of adjacent antenna elements is lower than, or equal to, half of an operating wavelength of the antenna device.

11. The antenna device according to claim 9, wherein the second antenna assembly is rotatably mounted on the antenna case and is configured to be rotated to receive the second radiofrequency signals when the antenna device is on, or when a communication is ongoing.

12. The antenna device according to claim 9, wherein the antenna case has a cylindrical shape, and wherein the first antenna assembly is arranged on a first base of the antenna case and the second antenna assembly is arranged either on a second base, or on a lateral surface, of the antenna case.

13. A communication device comprising the antenna device as claimed in claim 1.

14. A communication device comprising:
the antenna device as claimed in claim 1; and
at least one receiving assembly coupled with the radiofrequency signal handling assembly to receive and process the output radiofrequency signal.

* * * * *